UNITED STATES PATENT OFFICE.

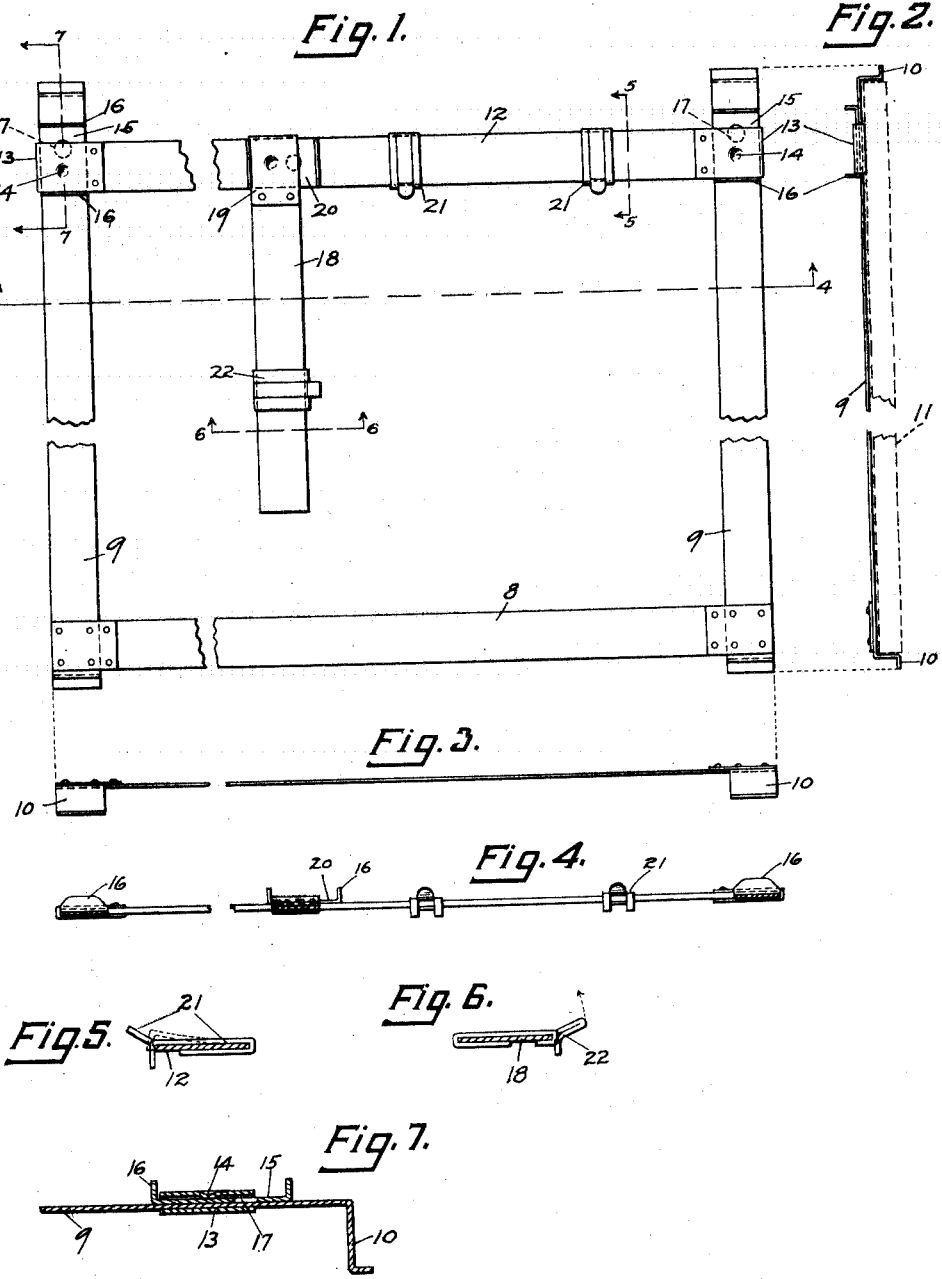

EBER R. BRADLEY, OF HOOD RIVER, OREGON.

GAGE AND GUIDE FOR PRESS-PLATENS.

1,385,169.　　　　Specification of Letters Patent.　　Patented July 19, 1921.

Application filed February 19, 1921.　Serial No. 446,448.

*To all whom it may concern:*

Be it known that I, EBER R. BRADLEY, a citizen of the United States, residing at Hood River, in the county of Hood River and State of Oregon, have invented a new and useful Improvement in Gages and Guides for Press-Platens, of which the following is a specification, reference being had to the accompanying drawings.

My invention relates to devices for gaging and guiding the sheets placed for impression in printing presses.

The object of my invention is to provide a device, attachable to a rectangular platen frame of a printing press, and which device has a bar and arm adjustable transversely to each other to desired relative positions over the tympan on the platen, also having means to support the impression sheet. These objects, as well as other advantages, I attain by the construction, combination and arrangement of parts shown in the accompanying drawings which form a part hereof.

Figure 1 is a plan view of the device.

Fig. 2 is an end view on the right as shown in Fig. 1.

Fig. 3 is a front view as shown in Fig. 1.

Fig. 4 is a sectional view on the line 4—4 in Fig. 1.

Fig. 5 is a sectional view on the line 5—5 of same figure.

Fig. 6 is a sectional view on the line 6—6 of same figure.

Fig. 7 is a sectional view on the line 7—7 of same figure.

Like characters refer to like parts in the views.

The device is arranged in rectangular frame form. The transverse, horizontal bar 8 is vertically uppermost in operative position. Vertical bars 9 are rigidly secured at their upper ends to and below the respective opposing ends of the bar 8. The bars 9 have angled free ends 10 which are arranged to engage the opposing edges of a platen frame 11, indicated in Fig. 2, to retain the device in position thereon and allow its easy removal. A lower transverse bar 12 is arranged with its ends drawn about the opposing bars 9 and rigidly secured to itself to form a loop 13, allowing the bar 12 to slide along the bars 9. The upper parts of the loop 13 have indentations 14 in their centers. Between the upper surface of the bars 9 and the opposing surface of the loops 13, sliding catches 15 are placed. These catches have angled edges 16 at each end, by which they may be gripped. They also have openings 17, in alinement with the indentations 14 and arranged to receive the latter. A vertical arm 18 is slidably arranged at its lower end upon the bar 12, having a loop 19 and catch 20 of similar forms to those at the ends of the bar 12. The free end of the arm 18 extends upwardly a desired distance within the rectangle formed by the other bars. The bar 12 and arm 18 are provided with impression paper supports 21 and 22 respectively, slidable along said bar and arm. It is contemplated that the bars and arm of the device shall be made of narrow and thin metal.

It will be seen that when the device is adjusted over the tympan and into engagement with the platen frame, the catches are pressed to a position where the bar indentations enter the openings in the catches. When thus released, the bar 12 is moved vertically to a desired position where its supports 21 may receive the lower end of the impression sheet, its catches are then moved until the bar indentations leave the catch openings and engage the surface of the catch, which secures the bar in the desired position. The paper supports 21 and 22 may also be adjusted to accommodate the paper. The arm 18 is also released, moved and secured in like manner, in a position where its catch 22 may engage the side of the impression sheet. It will thus be observed that the bar 12 and arm 18 may be adjusted to form a rectangle of desired length and width within the frame to fit the dimensions of the paper to be printed. This is done quickly, easily and with great accuracy, doing away with spacing pins and makeshift elements heretofore used to accomplish this purpose. The device is very simple, cheaply made and essentially new and useful. It is obvious that it supplies a most satisfactory gage and guide for the impression paper as it is laid upon the platen tympan. Those skilled in the art will readily understand its important functions to faciltate even and speedy running of printed matter.

I claim—

1. In a device of the kind described, the combination of, a frame of rectangular form having angled parts in quadrangular position extending downwardly, adapted to be engaged by a bail of common type and the frame to be thereby secured in a desired position upon a conventional platen, a transverse bar having each end slidably positioned on the side members of the frame, with indentations near the bar ends adjacent to the surface of the frame, and a sliding catch positioned between the bar and frame, the catch having an opening therein alined to receive the said bar indentation and allow the bar and catch to slide upon the frame and the bar to be rigidly secured upon the frame when the opening of the catch is moved out of alinement with the indentation.

2. In a device of the kind described, the combination of, a frame of rectangular form having angled parts in quadrangular position extending downwardly, adapted to be engaged by a bail of common type and the frame to be thereby secured in a desired position upon a conventional platen, a transverse bar having each end slidably positioned on the side members of the frame, with indentations near the bar ends adjacent to the surface of the frame, a sliding catch positioned between the bar and frame, the catch having an opening therein alined to receive the said bar indentation and allow the bar and catch to slide upon the frame and the bar to be rigidly secured upon the frame when the opening of the catch is moved out of alinement with the indentation, an arm arranged at a right angle to the bar, one end of the arm being slidable on the bar and having an indentation therein adjacent to the bar, and a sliding catch positioned between the arm and bar, the catch having an opening therein, the arm and catch being arranged to allow them to be slid along the bar, or rigidly secured thereon, in the same manner as hereinbefore mentioned relative to the bar and its catches.

3. In a device of the kind described, the combination of, a frame of rectangular form having angled parts in quadrangular position extending downwardly, adapted to be engaged by a bail of common type and the frame to be thereby secured in a desired position upon a conventional platen, a transverse bar having each end slidably positioned on the side members of the frame, with indentations near the bar ends adjacent to the surface of the frame, a sliding catch positioned between the bar and frame, the catch having an opening therein alined to receive the said bar indentation and allow the bar and catch to slide upon the frame and the bar to be rigidly secured upon the frame when the opening of the catch is moved out of alinement with the indentation, and supports or clips slidably arranged on said bar, adapted to engage paper sheets and retain them in a desired position relative to the bar.

4. In a device of the kind described, the combination of, a frame of rectangular form having angled parts in quadrangular position extending downwardly, adapted to be engaged by a bail of common type and the frame to be thereby secured in a desired position upon a conventional platen, a transverse bar having each end slidably positioned on the side members of the frame, with indentations near the bar ends adjacent to the surface of the frame, a sliding catch positioned between the bar and frame, the catch having an opening therein alined to receive the said bar indentation and allow the bar and catch to slide upon the frame and the bar to be rigidly secured upon the frame when the opening of the catch is moved out of alinement with the indentation, an arm arranged at a right angle to the bar, one end of the arm being slidable on the bar and having an indentation therein adjacent to the bar, a sliding catch positioned between the arm and bar, the catch having an opening therein, the arm and catch being arranged to allow them to be slid along the bar, or rigidly secured thereon, in the same manner as hereinbefore mentioned relative to the bar and its catches, and supports or clips slidably arranged on said bar and arm, the same being adapted to engage paper sheets and retain them in a desired position relative to the bar and arm.

EBER R. BRADLEY.

Witnesses:
J. M. CULBERTSON,
GEO. I. SLOCOM.